(12) United States Patent
Dasguptabandyopadhyay et al.

(10) Patent No.: US 12,111,856 B2
(45) Date of Patent: Oct. 8, 2024

(54) METHOD AND SYSTEM FOR LONG-FORM ANSWER EXTRACTION BASED ON COMBINATION OF SENTENCE INDEX GENERATION TECHNIQUES

(71) Applicant: Tata Consultancy Services Limited, Mumbai (IN)

(72) Inventors: Anumita Dasguptabandyopadhyay, Kolkata (IN); Prabir Mallick, Kolkata (IN); Tapas Nayak, Kolkata (IN); Indrajit Bhattacharya, Kolkata (IN); Sangameshwar Suryakant Patil, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 18/470,657

(22) Filed: Sep. 20, 2023

(65) Prior Publication Data

US 2024/0126791 A1    Apr. 18, 2024

(30) Foreign Application Priority Data

Oct. 14, 2022   (IN) .............................. 202221058931

(51) Int. Cl.
*G06F 16/30* (2019.01)
*G06F 16/31* (2019.01)
*G06F 16/332* (2019.01)

(52) U.S. Cl.
CPC .......... *G06F 16/31* (2019.01); *G06F 16/3329* (2019.01)

(58) Field of Classification Search
CPC .............................. G06F 16/31; G06F 16/3329
See application file for complete search history.

(56) References Cited

U.S. PATENT DOCUMENTS

2018/0129938 A1* 5/2018 Xiong .................... G06N 3/044
2020/0175015 A1* 6/2020 Al Hasan .............. G06F 16/355
(Continued)

FOREIGN PATENT DOCUMENTS

CN           111259127 B       5/2022

OTHER PUBLICATIONS

Dan Su et al., "Read before Generate! Faithful Long Form Question Answering with Machine Reading," arxiv, https://arxiv.org/pdf/2203.00343.pdf, (Mar. 2022).
(Continued)

*Primary Examiner* — Khanh B Pham
(74) *Attorney, Agent, or Firm* — Finnegan, Henderson, Farabow, Garrett & Dunner, LLP (57) ABSTRACT

This disclosure relates generally to long-form answer extraction and, more particularly, to long-form answer extraction based on combination of sentence index generation techniques. Existing answer extractions techniques have achieved significant progress for extractive short answers; however, less progress has been made for long form questions that require explanations. Further the state-of-art long-answer extractions techniques result in poorer long-form answers or not address sparsity which becomes an issue longer contexts. Additionally, pre-trained generative sequence-to-sequence models are gaining popularity for factoid answer extraction tasks. Hence the disclosure proposes a long-form answer extraction based on several steps including training a set of generative sequence-to-sequence models comprising a sentence indices generation model and a sentence index spans generation. The trained set of generative sequence-to-sequence models is further utilized for model long-form answer extraction based on a union of several sentence index generation techniques comprising a sentence indices and a sentence index spans.

8 Claims, 4 Drawing Sheets

(56) References Cited

U.S. PATENT DOCUMENTS

| | | | | |
|---|---|---|---|---|
| 2021/0240776 A1* | 8/2021 | Jawagal | ................. | G06N 3/049 |
| 2022/0171943 A1* | 6/2022 | Keskar | ................. | G06N 3/084 |
| 2022/0383159 A1* | 12/2022 | Yavuz | ................. | G06N 3/0455 |
| 2024/0070489 A1* | 2/2024 | Dang | ....................... | G06N 5/04 |

OTHER PUBLICATIONS

Peng Cui et al., "ListReader: Extracting List-form Answers for Opinion Questions," Sensors (Basel), arxiv, https://arxiv.org/ftp/arxiv/papers/2110/2110.11692.pdf, (Oct. 2021).

Peng Xu et al., "Attention-guided Generative Models for Extractive Question Answering," arxiv, https://arxiv.org/pdf/2110.06393.pdf, (Oct. 2021).

* cited by examiner

METHOD AND SYSTEM FOR LONG-FORM ANSWER EXTRACTION BASED ON COMBINATION OF SENTENCE INDEX GENERATION TECHNIQUES

PRIORITY CLAIM

This U.S. patent application claims priority under 35 U.S.C. § 119 to: Indian Patent Application No. 202221058931, filed on Oct. 14, 2022. The entire contents of the aforementioned application are incorporated herein by reference.

TECHNICAL FIELD

The disclosure herein generally relates to a long-form answer extraction and, more particularly, to long-form answer extraction based on combination of sentence index generation techniques.

BACKGROUND

Question answering (QA), or answer extraction techniques is a field of information retrieval and natural language processing (NLP) that automatically answer questions posed by humans in a natural language. The QA is implemented by learning a prior answers by a span prediction or generative models to further generate the answer from a context document when a question is asked.

Existing question answering datasets have achieved significant progress in models for providing extractive or unambiguous short answers. However, less attention has been paid to long long-form questions that require explanations. The task of long-form question answer is useful for obtaining reference answers which can be used in downstream assessment tasks in examinations and interviews, wherein the long-form answers typically contain at least 2 to 5 sentences forming one or more spans in the context.

The state-of-art approach for long-form extractive QA includes sentence extraction techniques and token span extraction techniques. But span extraction results are poorer for long-form answers than for factoid answers. The sentence extraction techniques, being discriminative in nature, do not address such sparsity of answer sentences in the context well, which becomes an issue longer contexts, such as a section or a subsection of a textbook. Additionally, large pre-trained generative sequence-to-sequence models have been shown to perform excellently in factoid answer generation/extraction tasks in recent years. Hence there is a need to explore possibilities of leveraging the advantages of all the techniques to come up with more efficient approach for long-form extractive QA.

SUMMARY

Embodiments of the present disclosure present technological improvements as solutions to one or more of the above-mentioned technical problems recognized by the inventors in conventional systems. For example, in one embodiment, a system for long-form answer extraction based on combination of sentence index generation techniques is provided. The system includes a memory storing instructions, one or more communication interfaces, and one or more hardware processors coupled to the memory via the one or more communication interfaces, wherein the one or more hardware processors are configured by the instructions to receive a plurality of inputs, via one or more hardware processors, wherein the plurality of inputs is associated with information regarding a dataset comprising a question, a document comprising an answer text for the question. The system is further configured to pre-process the plurality of inputs to obtain a set of pre-processed training data, via the one or more hardware processors, wherein the set of pre-processed training data comprises a plurality of pre-processed sentence indices data and a plurality of pre-processed sentence index spans. The system is further configured to train a set of generation models using the set of pre-processed training data based on a supervised learning technique, via the one or more hardware processors, where the set of models comprises a sentence indices generation model and a sentence index spans generation model, and wherein: the sentence indices generation model comprises a plurality of answer sentence indices and the sentence index spans generation model comprises a plurality of answer sentence index spans. The system is further configured to post-process the plurality of answer sentence indices and the plurality of answer sentence index spans of the set of generation models for a long-form answer extraction, via the one or more hardware processors, wherein the post-processing comprises: obtaining a first sentence indices by post-processing the plurality of answer sentence indices based on a cleaning technique and obtaining a second sentence indices by post-processing the plurality of answer sentence index spans based on a cleaning technique, and a span expansion technique.

In another aspect, a method for long-form answer extraction based on combination of sentence index generation techniques is provided. The method includes receiving a plurality of inputs, wherein the plurality of inputs is associated with information regarding a dataset comprising a question, a document comprising an answer text for the question. The method further includes pre-processing the plurality of inputs to obtain a set of pre-processed training data, wherein the set of pre-processed training data comprises a plurality of pre-processed sentence indices data and a plurality of pre-processed sentence index spans. method further includes training a set of generation models using the set of pre-processed training data based on a supervised learning technique, where the set of models comprises a sentence indices generation model and a sentence index spans generation model, and wherein: the sentence indices generation model comprises a plurality of answer sentence indices and the sentence index spans generation model comprises a plurality of answer sentence index spans. method further includes post-processing the plurality of answer sentence indices and the plurality of answer sentence index spans of the set of generation models for a long-form answer extraction, wherein the post-processing comprises: obtaining a first sentence indices by post-processing the plurality of answer sentence indices based on a cleaning technique and obtaining a second sentence indices by post-processing the plurality of answer sentence index spans based on a cleaning technique, and a span expansion technique.

In yet another aspect, a non-transitory computer readable medium for long-form answer extraction based on combination of sentence index generation techniques. The method includes receiving a plurality of inputs, wherein the plurality of inputs is associated with information regarding a dataset comprising a question, a document comprising an answer text for the question. The method further includes pre-processing the plurality of inputs to obtain a set of pre-processed training data, wherein the set of pre-processed training data comprises a plurality of pre-processed sentence indices data and a plurality of pre-processed sentence index spans. method further includes training a set of generation models using the set of pre-processed training data based on a supervised learning technique, where the set of models comprises a sentence indices generation model and a sentence index spans generation model, and wherein: the sentence indices generation model comprises a plurality of answer sentence indices and the sentence index spans generation model comprises a plurality of answer sentence index spans. method further includes post-processing the plurality of answer sentence indices and the plurality of answer sentence index spans of the set of generation models for a long-form answer extraction, wherein the post-processing comprises: obtaining a first sentence indices by post-processing the plurality of answer sentence indices based on a cleaning technique and obtaining a second sentence indices by post-processing the plurality of answer sentence index spans based on a cleaning technique, and a span expansion technique.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIG. 1 through FIG. 3B, where similar reference characters denote corresponding features consistently throughout the figures, there are shown preferred embodiments and these embodiments are described in the context of the following exemplary system and/or method.

Figure 1:
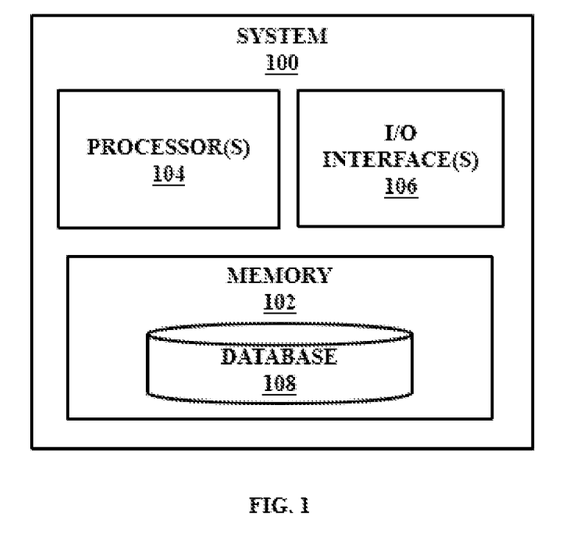
FIG. 1 illustrates an exemplary system for long-form answer extraction based on combination of sentence index generation techniques according to some embodiments of the present disclosure.

FIG. 1 is an exemplary block diagram of a system 100 for long-form answer extraction based on combination of sentence index generation techniques in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of the system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the memory 102 may include a database 108 configured to include information images, lookup tables, training data associated with long-form answer extraction based on combination of sentence index generation techniques. The memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

Figure 2:
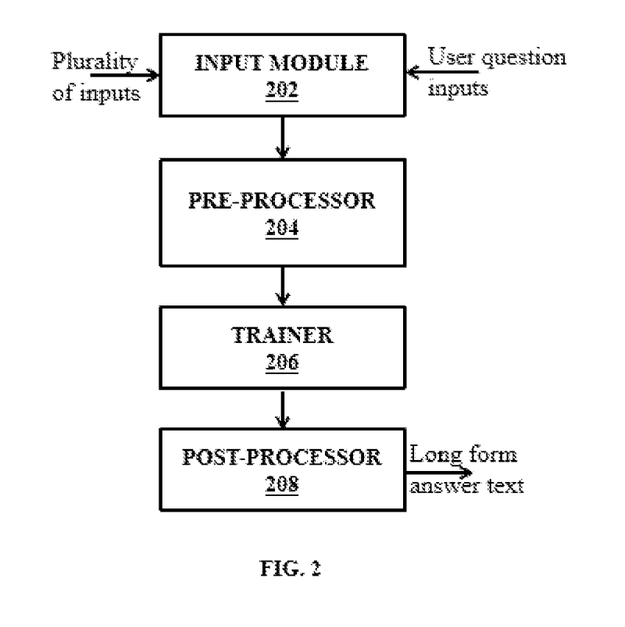
FIG. 2 is a functional block diagram for long-form answer extraction based on combination of sentence index generation techniques according to some embodiments of the present disclosure.
Figure 3A:
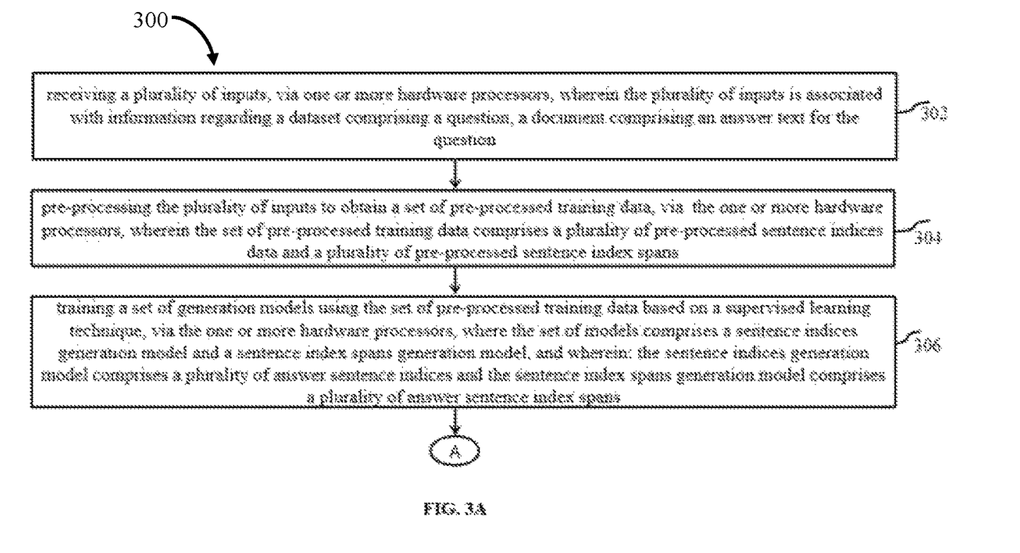
FIGS. 3A to 3B is a flow diagram illustrating a method (300) for long-form answer extraction based on combination of sentence index generation techniques in accordance with some embodiments of the present disclosure.
Figure 3B:
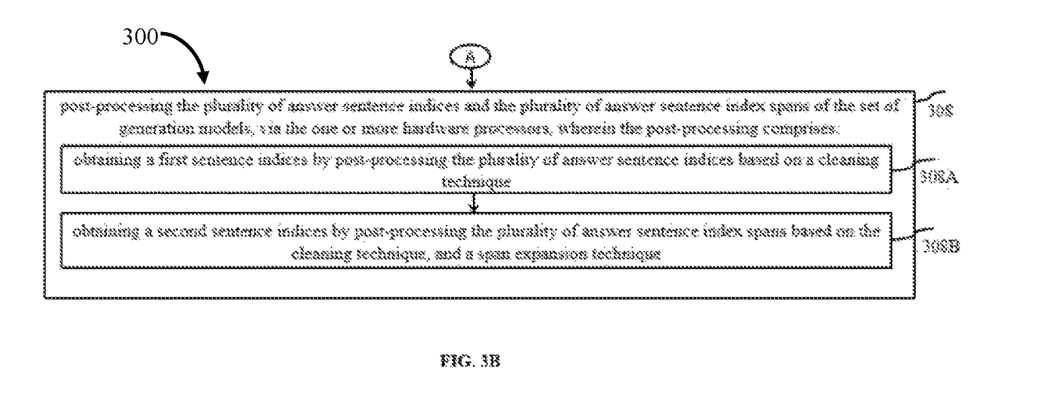

Functions of the components of system 100 are explained in conjunction with functional overview of the system 100 in FIG. 2 and flow diagram of FIG. 3A and FIG. 3B for long-form answer extraction based on combination of sentence index generation techniques.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIG. 2 is an example functional block diagram of the various modules of the system of FIG. 1, in accordance with some embodiments of the present disclosure. As depicted in the architecture, the FIG. 2 illustrates the functions of the modules of the system 100 that includes for long-form answer extraction based on combination of sentence index generation techniques.

As depicted in FIG. 2, the functional system 200 of system 100 system 200 is configured for long-form answer extraction based on combination of sentence index generation techniques.

The system 200 comprises an input module 202 configured for receiving a plurality of inputs, wherein the plurality of inputs is associated with information regarding a dataset comprising a question, a document comprising an answer text for the question. The system 200 further comprises a pre-processor 204 configured for pre-processing the plurality of inputs to obtain a set of pre-processed training data, wherein the set of pre-processed training data comprises a plurality of pre-processed sentence indices data and a plurality of pre-processed sentence index spans. The system 200 further comprises a trainer 206 configured for training a set of generation models using the set of pre-processed training data based on a supervised learning technique, where the set of models comprises a sentence indices generation model and a sentence index spans generation model. The system 200 further comprises a post-processor 208 configured for post-processing the plurality of answer sentence indices and the plurality of answer sentence index spans of the set of generation models. The post-processed set of generation models is utilized for extracting a long form answer text for a user question based on mapping of a union of the first sentence indices and the second sentence indices. Further these modules may reside in memory 102, to be executed by the processors 104 for performing the respective functions discussed.

The various modules of the system 100 and the functional blocks in FIG. 2 are configured for long-form answer extraction based on combination of sentence index generation techniques are implemented as at least one of a logically self-contained part of a software program, a self-contained hardware component, and/or, a self-contained hardware component with a logically self-contained part of a software program embedded into each of the hardware component that when executed perform the above method described herein.

Functions of the components of the system 200 are explained in conjunction with functional modules of the system 100 stored in the memory 102 and further explained in conjunction with flow diagram of FIGS. 3A-3B. The FIGS. 3A-3B with reference to FIG. 1, is an exemplary flow diagram illustrating a method 300 for long-form answer extraction based on combination of sentence index generation techniques using the system 100 of FIG. 1 according to an embodiment of the present disclosure.

The steps of the method of the present disclosure will now be explained with reference to the components of the system 100 of FIG. 1 for long-form answer extraction based on combination of sentence index generation techniques and the modules 202-208 as depicted in FIG. 2 and the flow diagrams as depicted in FIGS. 3A-3B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method 300, a plurality of inputs is received at the input module 202. The plurality of inputs is associated with information regarding a dataset comprising a question, a document comprising an answer text for the question.

In an embodiment, in an example scenario—a question is a type of sentence is asked to extract a long-answer and is a statement such as 'What is the effect of using approximate inference as part of a learning algorithm?' is used to elicit information from the corresponding document. Further the document comprising an answer text for the question contains multiple paragraphs of text where one or more sentences form the answer.

At step 304 of the method 300, the plurality of inputs is pre-processed to obtain a set of pre-processed training data at the pre-processor 204. The set of pre-processed training data comprises:

(a) a plurality of pre-processed sentence indices data, and
(b) a plurality of pre-processed sentence index spans.

In an embodiment, the plurality of pre-processed sentence indices data obtained based on a document truncation technique, appending a sentence index.

The document truncation includes considering the entire answer text span from the original document and extending span by adding sentences which appear immediately before and after the span as long as the extended span does not exceed a pre-defined number of tokens (1024 tokens). The sentence index is also appended at the beginning of each sentence in the document for the appending a sentence index.

In an embodiment, the answer sentence index formatting technique and the plurality of pre-processed sentence index spans obtained based on the document truncation technique, appending the sentence index and an answer index spans formatting technique.

The document truncation includes considering the entire answer text span from the original document and extending span by adding sentences which appear immediately before and after the span as long as the extended span does not exceed a pre-defined number of token (1024 tokens). The sentence index is also appended at the beginning of each sentence in the document for the appending a sentence index. Further, an output format of the dataset is processed to obtain a space separated list of answer index spans by mapping the answer text to document sentences. The answer index spans include pairing of begin and end indices, where each pair indicates that the sentences in between the begin and end indices are part of the answer.

At step 306 of the method 300, a set of generation models is trained using the set of pre-processed training data at the trainer 206. The set of models comprises:

(a) A sentence indices generation model, and
(b) A sentence index spans generation model.

The set of generation models is trained based on a supervised learning technique. The set of models are sequence-to-sequence models based on neural networks and includes one of a Bidirectional Auto-Regressive Transformers (BART) and a Text-to-Text Transfer Transformer (T5) models.

In an embodiment, the sentence indices generation model trained based on the plurality of pre-processed sentence indices data. The sentence indices generation model comprises a plurality of answer sentence indices.

The set of generation models are generative auto-regressive sequence-to-sequence models use chain rule and model the probability of each token $o_t$ in the output sequence o conditioned on the input sequence x and the previously generated tokens o<i, expresses as shown below $$\Pi_{i=i}^{n} P(o_i \vee o_i; x) \quad (1)$$

The set of generation models are trained by maximizing the loglikelihood of the input-output sequences in the training data. The input sequence x is created by concatenating the pre-processed document and the question, with a special separator '<sep>' token in between. The output sequence o is the sequence of answer sentence indices.

The sentence indices generation model comprises a plurality of answer sentence indices and the sentence index spans generation model comprises a plurality of answer sentence index spans.

The sentence index spans generation model trained based on the plurality of pre-processed sentence index spans. The sentence index spans generation model comprises a plurality of answer sentence index spans.

The set of generation models are generative auto-regressive sequence-to-sequence models use chain rule and model the probability of each token $o_i$ in the output sequence o conditioned on the input sequence x and the previously generated tokens $o_{<i}$. The model is trained by maximizing the loglikelihood of the input-output sequences in the training data. The input sequence x is created by concatenating the pre-processed document and the question, with a special separator '<sep>' token in between. The output sequence o is the sequence of answer sentence index spans.

At step 308 of the method 300, the plurality of answer sentence indices and the plurality of answer sentence index spans are post-processed in the post-processor 208. The post-processed—first set of indices and the second set of indices are utilized for extraction of a long form answer text is extracted for a user question. The long form answer text is extracted is extracted based on mapping of a union of the first sentence indices and the second sentence indices. The terms "first set of indices and the second set of indices', "post-processed set of generation models" have been interchangeably used in the disclosure.

The post-processing of the set of generation models comprises several steps as discussed below:

At step 308A, a first sentence indices are obtained by post-processing the plurality of answer sentence indices. The first sentence indices are obtained based on a cleaning technique.

In an embodiment, the cleaning technique comprises several steps including a duplicate removal, a sorting and an out-of-range removal.

The first sentence indices are generated out of order, in duplicate, or out of range. The first sentence indices are post-processed by removing duplicates, sorting the indexes and pruning those out of range.

At step 308B, a second sentence indices are obtained by post-processing the plurality of answer sentence index spans. The second sentence indices are obtained based on a cleaning technique, and a span expansion technique.

The cleaning technique comprises several steps including a duplicate removal, a sorting and an out-of-range removal.

The span expansion technique comprises several steps including a removal process, a pruning process and the out-of-range removal, a merging process and an expansion process.

The answer sentence index spans may be generated out of order, in duplicate, or out of range. Hence, the answer sentence index spans are post-processed by removing duplicates, sorting the indexes and pruning those out of range. Additionally, the answer index spans might have an odd number of indices, which means that the final begin index is not paired with an end index, hence the final index is removed and spans are pruned where the begin index is higher than the end index. Further the answer index spans which contain out-of-range indices is also removed and merges when they intersect with or subsume another span.

The post-processed set of generation models are used for long-form answer extraction. A user question input is received from a user for long-form answer extraction. The user question input comprises a user question and a document, wherein the document comprises of a long-form answer for the user question.

For extracting an answer for a user question given the corresponding document, the pre-processed document concatenated with the question is given as input to the sentence indices generation model, which outputs answer sentence indices. A first sentence indices are obtained by post-processing the answer sentence indices. Further, the pre-processed document concatenated with the question is given as input to the sentence index spans generation model, which outputs answer index spans. A second sentence indices are obtained by post-processing the answer index spans. The first set of indices and the second set of indices are utilized for extraction of a long form answer text for a user question. The long form answer text is extracted based on mapping of a union of the first sentence indices and the second sentence indices.

EXPERIMENTS: For experimental purposes MASH-QA dataset has been utilized. The same dataset has been utilized to illustrate the performance of different pre-trained language model-based sentence classification techniques like Bidirectional Auto-Regressive Transformers (BART), RoBERTa, XLNet and the state-of-the art MultiCo model. The performance of BART based direct answer text generation is considered as another baseline. The result illustrates that both sentence index generation and the sentence index span generation techniques individually and their union beats the baselines significantly. The union of index generation techniques performs best in terms of both sentence level and token level evaluation.

TABLE 1

Performance comparison

| Model | Sentence Indices | | | Sentence Index Spans | | |
| --- | --- | --- | --- | --- | --- | --- |
| | Prec | Rec | F1 | Prec | Rec | F1 |
| BERT | 0.45 | 0.64 | 0.53 | 0.51 | 0.66 | 0.54 |
| ROBERTa | 0.48 | 0.64 | 0.55 | 0.55 | 0.63 | 0.55 |
| XLNet | 0.61 | 0.74 | 0.67 | 0.71 | 0.81 | 0.73 |
| MultiCo | 0.61 | 0.73 | 0.66 | 0.71 | 0.80 | 0.72 |
| $BART_{sent\_ind}$ | 0.66 | 0.71 | 0.68 | 0.77 | 0.80 | 0.76 |
| $BART_{span\_ind}$ | 0.68 | 0.69 | 0.68 | 0.77 | 0.79 | 0.75 |
| $BART_{text}$ | | | | 0.70 | 0.64 | 0.64 |
| $BART_{ind\_union}$ | 0.63 | 0.78 | 0.7 | 0.73 | 0.85 | 0.78 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

This disclosure relates generally to long-form answer extraction and, more particularly, to long-form answer extraction based on combination of sentence index generation techniques. Existing answer extractions techniques have achieved significant progress for extractive short answers; however, less progress has been made for long-form questions that require explanations. Further the state-of-art long-answer extractions techniques result in poorer long-form answers or not address sparsity which becomes an issue in longer contexts. Additionally, pre-trained generative sequence-to-sequence models are gaining popularity for factoid answer extraction tasks. Hence the disclosure proposes a long-form answer extraction based on several steps including training a set of generative sequence-to-sequence models comprising a sentence indices generation model and a sentence index spans generation model. The trained set of generative sequence-to-sequence models is further utilized for long-form answer extraction based on a union of several sentence index generation techniques comprising a sentence indices and a sentence index spans.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
receiving a plurality of inputs, via one or more hardware processors, wherein the plurality of inputs is associated with information regarding a dataset comprising a question, a document comprising an answer text for the question;
pre-processing the plurality of inputs to obtain a set of pre-processed training data, via the one or more hardware processors, wherein the set of pre-processed training data comprises a plurality of pre-processed sentence indices data and a plurality of pre-processed sentence index spans, wherein the plurality of pre-processed sentence indices data obtained using a document truncation technique, wherein the document truncation technique includes selecting an entire answer text span from the document and extending the text span by adding sentences appearing immediately before and after the span as long as the extended span does not exceed a pre-defined number of tokens, wherein a sentence index of the plurality of sentence indices is appended at the beginning of each sentence in the document for the appending the sentence index;
training a set of generation models using the set of pre-processed training data based on a supervised learning technique, via the one or more hardware processors, where the set of generation models comprises a sentence indices generation model and a sentence index spans generation model, wherein the set of generation models are sequence-to-sequence models generated using neural networks, and wherein the sentence indices generation model comprises a plurality of answer sentence indices and the sentence index spans generation model comprises a plurality of answer sentence index spans, wherein the sentence indices generation model trained using the plurality of pre-processed sentence indices data, and the sentence index spans generation model trained using the plurality of pre-processed sentence index spans, wherein the set of generation models are generative auto-regressive sequence-to-sequence models using chain rule and modeling the probability of each token $o_i$ in the output sequence o conditioned on the input sequence x and the previously generated tokens $o_{<i}$, wherein the set of generation models are trained by maximizing loglikelihood of the input-output sequences in the pre-processed training data; and post-processing the plurality of answer sentence indices and the plurality of answer sentence index spans of the set of generation models for a long-form answer extraction, via the one or more hardware processors, wherein the long form answer text is extracted for a user question input, based on mapping of a union of the first sentence indices and the second sentence indices, wherein the post-processing comprises:

obtaining a first sentence indices by post-processing the plurality of answer sentence indices based on a cleaning technique; and obtaining a second sentence indices by post-processing the plurality of answer sentence index spans based on the cleaning technique, and a span expansion technique.

2. The method of claim 1, the cleaning technique comprises several steps including a duplicate removal, a sorting and an out-of-range removal and the span expansion technique comprises several steps including a removal process, a pruning process and the out-of-range removal, a merging process and an expansion process.

3. The method of claim 1, wherein the input sequence x is created by concatenating the pre-processed document and the question, with a special separator '<sep>' token in between the output sequence o is the sequence of answer sentence indices.

4. A system, comprising:
a memory storing instructions;
one or more communication interfaces; and
one or more hardware processors coupled to the memory via the one or more communication interfaces, wherein the one or more hardware processors are configured by the instructions to:

receive a plurality of inputs, wherein the plurality of inputs is associated with information regarding a dataset comprising a question, a document comprising an answer text for the question;

pre-process the plurality of inputs to obtain a set of pre-processed training data, wherein the set of pre-processed training data comprises a plurality of pre-processed sentence indices data and a plurality of pre-processed sentence index spans, wherein the plurality of pre-processed sentence indices data obtained using a document truncation technique, wherein the document truncation technique includes an entire answer text span from the document and extending the text span by adding sentences appearing immediately before and after the span as long as the extended span does not exceed a pre-defined number of tokens, wherein a sentence index of the plurality of sentence indices is appended at the beginning of each sentence in the document for the appending the sentence index;

train a set of generation models using the set of pre-processed training data based on a supervised learning technique, where the set of models comprises a sentence indices generation model and a sentence index spans generation model, wherein the set of models are sequence-to-sequence models based on neural networks, and wherein: the sentence indices generation model comprises a plurality of answer sentence indices and the sentence index spans generation model comprises a plurality of answer sentence index spans, wherein the sentence indices generation model trained using the plurality of pre-processed sentence indices data, and the sentence index spans generation model trained using the plurality of pre-processed sentence index spans, wherein the set of generation models are generative auto-regressive sequence-to-sequence models use chain rule and model the probability of each token $o_i$ in the output sequence o conditioned on the input sequence x and the previously generated tokens $o_{<i}$, wherein the set of generation models are trained by maximizing the loglikelihood of the input-output sequences in the training data; and post-process the plurality of answer sentence indices and the plurality of answer sentence index spans of the set of generation models for a long-form answer extraction, wherein the long form answer text is extracted for a user question input, based on mapping of a union of the first sentence indices and the second sentence indices, wherein the post-processing comprises:

obtaining a first sentence indices by post-processing the plurality of answer sentence indices based on a cleaning technique; and obtaining a second sentence indices by post-processing the plurality of answer sentence index spans based on the cleaning technique and a span expansion technique.

5. The system of claim 4, wherein the cleaning technique comprises several steps including a duplicate removal, a sorting and an out-of-range removal and the span expansion technique comprises several steps including a removal process, a pruning process and the out-of-range removal, a merging process and an expansion process.

6. The system of claim 4, wherein the input sequence x is created by concatenating the pre-processed document and the question, with a special separator '<sep>' token in between the output sequence o is the sequence of answer sentence indices.

7. One or more non-transitory machine-readable information storage mediums comprising one or more instructions which when executed by one or more hardware processors cause:

receiving a plurality of inputs, wherein the plurality of inputs is associated with information regarding a dataset comprising a question, a document comprising an answer text for the question;

pre-processing the plurality of inputs to obtain a set of pre-processed training data, wherein the set of pre-processed training data comprises a plurality of pre-processed sentence indices data and a plurality of pre-processed sentence index spans, wherein the plurality of pre-processed sentence indices data obtained using a document truncation technique, wherein the document truncation technique includes an entire answer text span from the document and extending the text span by adding sentences appearing immediately before and after the span as long as the extended span does not exceed a pre-defined number of tokens, wherein a sentence index of the plurality of sentence indices is appended at the beginning of each sentence in the document for the appending the sentence index;

training a set of generation models using the set of pre-processed training data based on a supervised learning technique, where the set of models comprises a sentence indices generation model and a sentence index spans generation model, wherein the set of models are sequence-to-sequence models based on neural networks, and wherein the sentence indices generation model comprises a plurality of answer sentence indices and the sentence index spans generation model comprises a plurality of answer sentence index spans, wherein the sentence indices generation model trained using the plurality of pre-processed sentence indices data, and the sentence index spans generation model trained using the plurality of pre-processed sentence index spans, wherein the set of generation models are generative auto-regressive sequence-to-sequence models use chain rule and model the probability of each token $o_i$ in the output sequence o conditioned on the input sequence x and the previously generated tokens $o_{<i}$, wherein the set of generation models are trained by maximizing the loglikelihood of the input-output sequences in the training data; and post-processing the plurality of answer sentence indices and the plurality of answer sentence index spans of the set of generation models for a long-form answer extraction, via the one or more hardware processors, wherein the long form answer text is extracted for a user question input, based on mapping of a union of the first sentence indices and the second sentence indices, wherein the post-processing comprises:
obtaining a first sentence indices by post-processing the plurality of answer sentence indices based on a cleaning technique; and
obtaining a second sentence indices by post-processing the plurality of answer sentence index spans based on the cleaning technique, and a span expansion technique.

8. The one or more non-transitory machine-readable information storage mediums of claim 7, the cleaning technique comprises several steps including a duplicate removal, a sorting and an out-of-range removal and the span expansion technique comprises several steps including a removal process, a pruning process and the out-of-range removal, a merging process and an expansion process.

* * * * *